Reissued July 19, 1927. Re. 16,683

UNITED STATES PATENT OFFICE.

WILLIAM ROBERT SHIMER, OF BETHLEHEM, PENNSYLVANIA, ASSIGNOR TO BETHLEHEM STEEL COMPANY.

STEEL OF HIGH-TEMPERATURE STABILITY.

No Drawing. Original No. 1,624,075, dated April 12, 1927, Serial No. 752,929, filed November 29, 1924. Application for reissue filed May 26, 1927. Serial No. 194,520.

This invention relates to alloy steels that are required to maintain their physical properties at substantially high temperatures. It relates more particularly to the use of tungsten in small proportions to preserve said physical properties of the steel at high temperatures.

The primary object of my invention is to produce a high tensile steel of cheap manufacture that will be capable of resisting high temperatures without substantial loss of strength.

A further object of my invention is the use of an addition agent to preserve at high temperatures the physical characteristics of a steel having high tensile properties at normal temperatures.

It is well known to add chromium to steel in order to increase its tensile strength in its untreated state. Chrome steels, of this description, cannot be submitted to high temperatures without losing their characteristic properties of high tensile strength.

I have found, however, that small additions of tungsten in conjunction with chromium serve to modify the effect of high temperature on the steel, while at the same time improving the ductility of the steel at normal temperatures without impairing the high tensile strength conferred thereon by the chromium.

I have found that a suitable range of composition for a low carbon steel capable of withstanding exposure to high temperatures, without substantial loss of its physical properties, is as follows: Chromium from a fraction of 1% to 2%, tungsten from a fraction of 1% to 2%, manganese from .5 to 1.5%, carbon up to .75%, and the balance iron with the usual proportions of sulphur, phosphorus and silicon.

A preferred composition that has given very satisfactory results contains besides iron; chromium .43, tungsten 1.30, manganese .64, carbon .33. After treatment at 1600° F. and oil quenching and retreatment at 1200° and air quenching, this composition gave the following physical tests: Yield point 143,500 lbs; tensile strength 163,000; elongation 14%. Test bars from the same heat and similarly heat treated, when tested at different temperatures gave the following results:

| Temperature ° F. | Yield. | Tensile strength. | Reduction per cent. |
|---|---|---|---|
| 700 | 120,000 | 155,000 | 43.38 |
| 800 | 120,000 | 151,000 | 44.85 |
| 900 | 105,000 | 130,000 | 53.31 |
| 1000 | 90,000 | 124,000 | 58.57 |
| 1100 | 65,000 | 119,000 | 60.32 |
| Normal | 143,500 | 163,000 | 48.50 |

I have also found that the addition of tungsten up to 2% in the case of a low carbon steel containing no chromium, renders the steel more stable at high temperatures.

From the view point of cheapness and for purposes of general utility, such as bolts, studs and nuts exposed to high temperatures, rollers, pins and links for hot conveyors and for similar purposes, I prefer to use a composition within the following limits:

Chromium .30 to .60; tungsten .90 to 1.15; manganese .90 to 1.10; carbon .30 to .40, and the balance iron with customary proportions of sulphur, phosphorus and silicon. In other words, for the purposes named, I use a steel having broadly chromium up to 1% with tungsten and manganese each substantially twice the chromium.

For certain special purposes requiring high initial tensile strength and high initial elastic limit, which properties are to be substantially preserved at high temperatures, as for example, oil cracking stills operating at a temperature of 600° F. and an internal pressure of 150 lbs. per sq. inch, I consider that a low carbon steel having approximately equal proportions of chromium and tungsten, each up to 2%, with manganese up to 1.5% is eminently suitable. The higher content of chromium used in this case serves to insure a close grained structure in the metal whereby it is less subject to corrosive deterioration from contact with the furnace gases, while the tungsten, as heretofore explained, serves to preserve the physical qualities of the steel at the high temperatures to which it is exposed.

Aside from the distinctive properties of my alloy in respect of their maintaining to a substantial degree their physical properties at high temperatures, I have also discovered that by appropriate treatment I can endow my alloy with very high tensile qualities at normal temperatures. For example, a low carbon steel containing chromium 0.43, tungsten 1.30 and manganese 0.64, when hardened at 1600° F. and oil quenched and retreated at 800° F. and air cooled, gave the following results: Yield 190,000 lbs., tensile strength 222,000, elongation 12%.

Having thus described my invention what I claim as new and desire to secure by Letters Patent is:

1. A low-carbon, tough, and readily workable commercial steel containing between .40 and .60 chromium, between .50 and .80 manganese and with tungsten between 1% and 1.50% added thereto to preserve the strength of the steel at high temperatures.

2. A steel containing as the essential ingredients other than iron, carbon from low to medium content, chromium .43%, tungsten 1.3% and manganese not exceeding .64%.

3. A steel containing as the essential ingredients other than iron, carbon from low to medium content, chromium .30% to .60%, tungsten .90% to 1.15% and manganese not to exceed 1.10%.

4. A steel having a yield point of 190,000, tensile strength 222,000 and elongation 12%, containing as the essential ingredients other than iron, carbon from low to medium content, chromium .43%, tungsten 1.30%, and manganese .64%.

5. A steel containing as the essential ingredients other than iron, carbon from low to medium content, chromium in effective amounts but not more than .60% and tungsten in effective amounts not more than 1.3%, having high tensile strength and elastic limit both at atmospheric and high temperatures.

6. An article of manufacture adapted to be subjected to great stresses under widely different temperature conditions composed of a steel containing as the essential constituents other than iron, carbon from low to medium content, chromium in effective amount but appreciably less than 1% and tungsten from a fraction of 1% to 2%.

WILLIAM ROBERT SHIMER.